June 6, 1961 J. D. SYLVESTER ET AL 2,987,106
METHOD AND MACHINE FOR FORMING EDGE SEALS ON BAGS
Filed Sept. 4, 1957 2 Sheets-Sheet 1
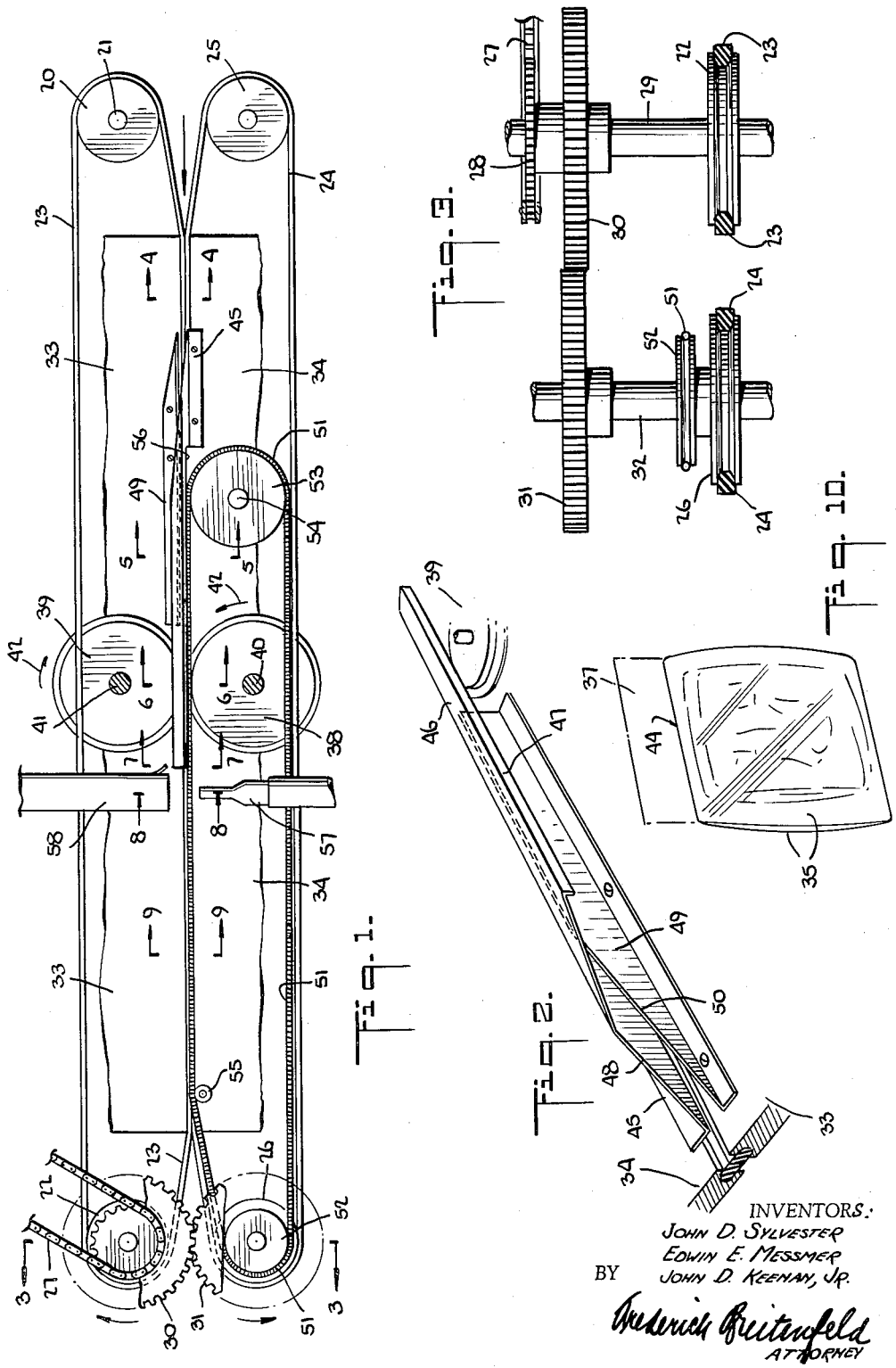
INVENTORS:
JOHN D. SYLVESTER
EDWIN E. MESSMER
JOHN D. KEENAN, JR.
BY
Frederick Breitenfeld
ATTORNEY

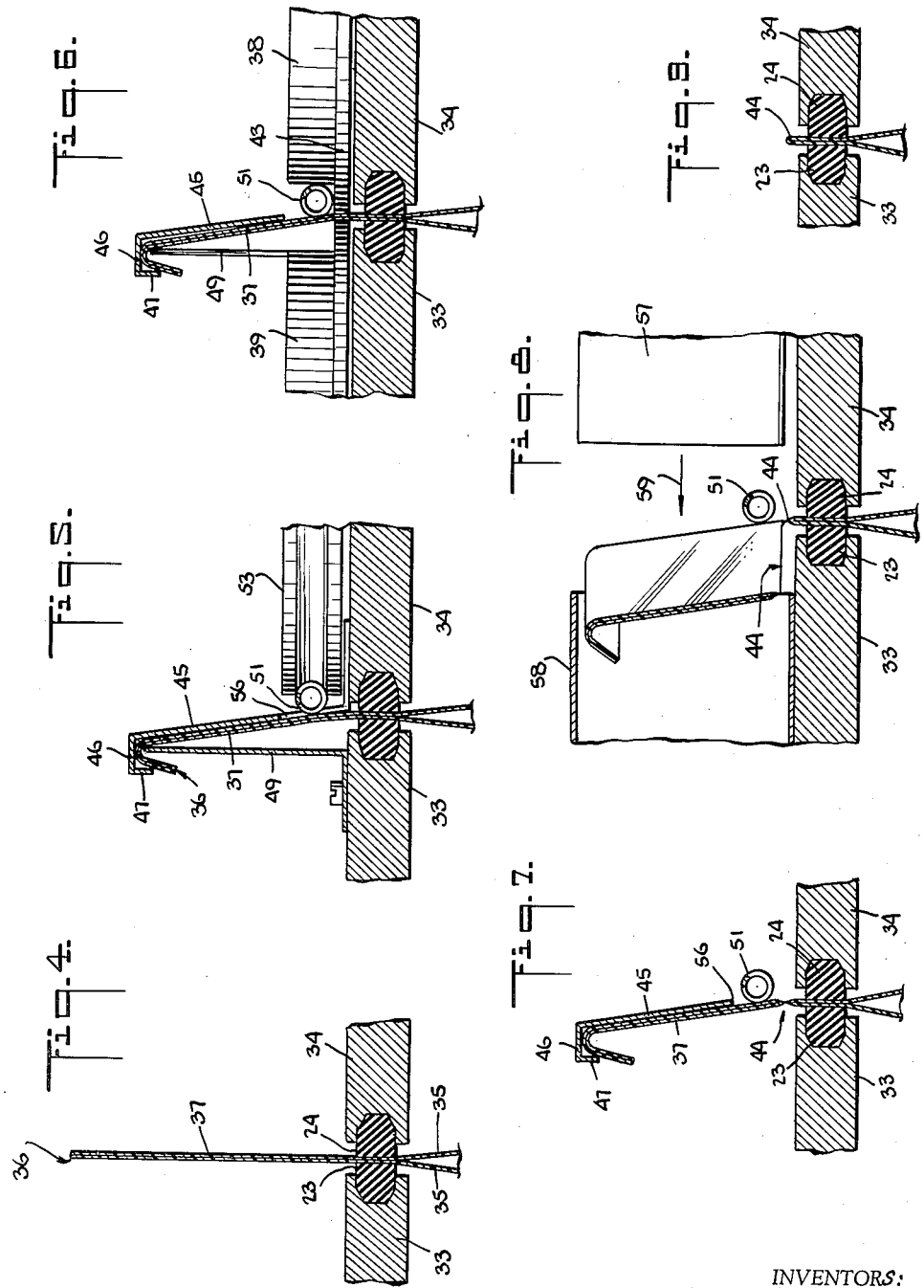

United States Patent Office 2,987,106
Patented June 6, 1961

2,987,106
METHOD AND MACHINE FOR FORMING EDGE SEALS ON BAGS
John D. Sylvester, Garden City, and Edwin E. Messmer, Roslyn Heights, N.Y., and John D. Keenan, Jr., Caldwell, N.J., assignors to Amsco Packaging Machinery Inc., Long Island City, N.Y., a corporation of New York
Filed Sept. 4, 1957, Ser. No. 681,920
8 Claims. (Cl. 154—42)

This invention relates generally to heat-sealing apparatus, and has particular reference to the sealing together of superposed heat-sealable plies of material.

The type of apparatus to which the invention relates is known as a rotary sealer, and involves the advancement of the superposed plies to and through the nip of a pair of complementary rollers at least one of which has a heated attenuated edge.

The machine is intended primarily to seal the openings of plastic bags filled with merchandise. The bags may be of any desired shape or structural character, and at the opening to be sealed the opposite walls of the bag are arranged in superposed relation and constitute the plies that are to be bonded together. The bags are intended to be engaged successively by a pair of opposed advancing members, such as a pair of opposed belts which lead the bags successively to and through the nip of the sealing rollers, then to a point of discharge. The bags may be subjected to the action of the advancing belts by automatic mechanism, or manually.

It is a general object of the invention to provide an improved rotary sealing machine of the foregoing general character, capable on a continuous production basis of producing what is known as an edge seal on the bags. An edge seal is one in which the two walls of the bag are bonded together along a line which defines the edge of the sealed container. This means that the seal is effected along a relatively thin line, and that all excess material lying beyond this sealing line must be disposed of. Among the special features of the invention are the improved means and arrangements of parts by means of which this desired result can be achieved in a commercially practical and reliable manner.

Since it is not feasible to bring together and seal the extreme edges of the two walls of a bag opening, it is desirable in practice to engage the bag along a region somewhat spaced from the edges of the opening. This brings the walls or plies flatwise together, and in this superposed relation they are passed between the sealing rollers and subjected to the bonding action of the latter. In accordance with this invention, special means are provided for coping with the excess margin or skirt lying beyond the sealing line, in order (first) to shield this projecting region from undesired contact with the rollers and (second) to sever it and remove it immediately after the sealing procedure has been performed. The improved mechanism is specially designed to provide a means for accomplishing this result in a workmanlike and reliable fashion. The new construction involves a special deflector plate or plates for engaging the projecting region during the approach of the bag to the sealing rollers, a special belt arranged in a novel manner adjacent to the sealing line along the path of travel immediately preceding and following the passage through the nip of the sealing rollers, and a pneumatic device positioned so as to be operable upon the projecting region while the sealing line is still plastic immediately subsequent to the heat-sealing operation.

It is a coordinate object of the invention to provide an improved method of handling and treating filled bag-like containers composed of heat-sealable material, to seal the openings of such containers to form edge seals thereon.

These general objectives and advantages may be achieved, and the benefits of the improved method attained, in the manner illustratively exemplified in the accompanying drawings, in which—

FIGURE 1 is a diagrammatic plan view of an apparatus embodying the features of the invention, and by means of which, if desired, the procedural steps of the new method may be performed;

FIGURE 2 is a fragmentary perspective view of the special deflector plates operable upon the superposed plies as they approach the sealing station;

FIGURE 3 is an enlarged fragmentary cross-sectional view substantially along the line 3—3 of FIGURE 1;

FIGURES 4–9 are enlarged fragmentary cross-sectional views taken substantially along correspondingly-numbered lines of FIGURE 1, showing the successive actions to which the superposed plies are subjected; and FIGURE 10 is a perspective view of an illustrative sealed container resulting from the practice of this invention.

The apparatus depicted in FIGURE 1 is mounted upon suitable supporting framework (not shown), which includes bearings for the several shafts shown, and a source of driving power which may be an electric motor. Appropriate enclosures to protect the various parts of the mechanism, and also to guard the operator against possible injury by inadvertent contact with moving parts or heated elements, are also provided; but these enclosures have not been depicted since they are of known character and have no direct bearing upon the basic features of the invention.

The apparatus is preferably mounted in such a way that it may be bodily tilted, so that the shafts shown in FIGURES 1 and 3 may be selectively positioned with their axes vertical, or with their axes at an oblique angle. This permits the procedure to be carried out with the bags in the generally vertical disposition shown in the drawings, or (optionally) at inclination to the vertical, such inclinations being desirable under certain circumstances, depending upon the size and nature of the bags, and the commodities or other articles contained within them.

Mounted upon a pulley 20, which is supported on the shaft 21, and extending around a similar pulley 22 at a distance from the pulley 20, is an endless belt 23. This belt cooperates with a similar belt 24 similarly mounted upon a pair of spaced pulleys 25 and 26. The pulleys 22 and 26 are the driving pulleys, and they rotate in the direction of the arrows shown at the left of FIGURE 1. The driving power may be derived from any suitable source, such as an electric motor (not shown) which drives a chain 27. In the drawings this chain is illustratively shown in engagement with the sprocket 28 mounted on the shaft 29 of the pulley 22, there being a gear 30 on the shaft 29 meshing with a similar gear 31 on the shaft 32 of the pulley 26.

The belts 23 and 24 may be composed of any suitable material, such as rubber, and in cross section the configuration is preferably of a kind which presents flat surfaces outward, as best indicated in FIGURES 3–9. The inner laps of the belts are guided along grooves formed in adjacent table sections 33 and 34, the belt faces being in close proximity and adapted to grasp and hold between them the plies of a bag to be sealed. The parts are constructed and arranged in such a way that the belt laps approach each other gradually, as shown at the right of FIGURE 1, whereby bags to be treated may be successively inserted at this region and grasped by the belts as they come together. Thus engaged, each bag is conveyed by the belts to and past a sealing station, and in the region where the belts diverge again, as shown at the left of FIGURE 1, the finished sealed bags are discharged.

The bags that are subjected to the improved procedure, and introduced into the apparatus at the right end of FIGURE 1, are previously filled with the articles or other merchandise which they are to contain. The bags are usually of a generally rectangular shape, as indicated in FIGURE 10, and are defined by opposed walls of heat sealable material. Illustrative of such material, commonly employed for bags, is polyethylene, but any equivalent material adapted to be softened by heat may be used.

After having been filled, manually or by automatic machinery of any suitable character, the bags are brought into position, opening upward, for engagement by the converging belts 23, 24 at the right end of FIGURE 1. An illustrative bag is shown in FIGURE 4, immediately after having been engaged. It will be observed that the opposed walls 35 have been grasped along a linear area adjacent to the filled section of the bag and somewhat spaced from the bag opening 36. This leaves the upper region of the bag projecting upwards, as indicated at 37.

The bags are successively conveyed in this manner to the sealing station indicated in the medial part of FIGURE 1. At this station there are a pair of cooperating rollers 38 and 39 mounted on shafts 40, 41 respectively, and arranged in tangential relation. They are rotated by any appropriate means, in the direction of the arrows 42 at speeds which move their tangentially contacting parts at the same speed, or substantially the same speed, as the linear advancement of the belts. At least one of the rollers is heated, and in the preferred construction the roller 38 is provided with a heating means of any suitable character (not shown) which maintains the attenuated edge part 43 of this roller at the desired high temperature. This temperature will depend, of course, upon the nature of the material upon which the rollers are acting, and in the case of polyethylene bags it is preferable to maintain a temperature between 600 and 650° F.

The projecting region 37 of the bag is thus directed to and through the nip of the rollers 38, 39, and during this passage the superposed plies of the projecting region 37 are heat sealed together along the line 44 (FIGURE 7).

It is highly important, especially where high temperatures are involved, that inadvertent contact between the projecting region 37 and the heated roller 38 be prevented, because of the great tendency of the heat-softenable material to adhere to any heated surface. Similarly, it is obvious that the marginal section of the projecting region 37 that lies beyond the seal line 44 (i.e., the section lying above this line as viewed in FIGURES 7 and 8) is a discardable skirt which can be readily separated and removed while the seal line 44 is still in a soft condition, but which will freeze to and remain attached to the sealed bag if the separation is not immediately attended to. Because of these various circumstances and considerations, the projecting region 37 must be adequately coped with, both before and after the sealing operation, if the desirable objectives of the invention are to be achieved. The structural innovations contributing toward this result will now be described.

Mounted on the table 34 along the line of advance of the belt 23, 24, and in the region of travel preceding the nip of the rollers 38, 39, is a special deflector plate 45. It extends upwardly and is angled in a slightly oblique direction away from the heated roller 38. Along its top edge it is provided with a horizontal part 46, and at its extreme edge it is desirable to provide a short downwardly-directed flange 47. The deflector 45 is positioned to be encountered by the upstanding projecting region 37 of each approaching bag. As best indicated in FIGURE 2, the height of the deflector plate 45 increases gradually, so that the leading edge 48 is arranged along an incline. As a result, the initial contact with each projecting region 37 is at the lower part of the latter, whereby the projecting region is gradually and reliably guided into a shielded position behind and beneath the plate 45.

The deflector plate 45 is preferably employed in cooperative association with a second deflector plate 49 supported on the other table part 33. The leading edge of the plate 49 is similarly gradually inclined as shown at 50, and it terminates in a top edge lying relatively close to and beneath the top part 46 of the first deflector. As a result, if the projecting part 37 of any bag exceeds in height, the upper marginal part will be doubled upon itself around the top edge of the plate 49, as best indicated in FIGURE 5.

Whether the region 37 is or is not doubled upon itself it will be observed that the plate 45 shields it during its approach to the heated roller 38 and during its passage through the heating station and beyond.

As a second instrumentality in shielding and properly guiding the projecting region 37 of the advancing bag, a special third belt 51 is provided. This belt is of heat-resistant material, preferably assuming the form of a spiral metal spring or helix, closely wound. The belt 51 is mounted upon and driven by a pulley 52 mounted on the shaft 32 slightly above the pulley 26 (see FIGURE 3), and extends to and around a pulley 53 supported on a stub shaft 54 in the region of approach to the heated roller 38. The pulley 53 is of such size, and is so located, that the inner lap of the belt 51 (i.e., the lap moving in the direction of the advancing bag or bags) is parallel to the path of travel of the advancing belts 23, 24, and is directly adjacent and in contact with the lower part of the projecting region 37. A guide pulley or wheel 55 at the end of the table part 34 helps to maintain the belt 51 in the proper disposition.

In FIGURE 6 it will be observed that the belt 51 is so located and mounted that it rides tangentially against and in direct contact with the heated roller 38 at the sealing point. As a result, it firmly engages the projecting region 37 during the critical period when the heat sealable material of the bag is being softened, hence weakened, by the creation of the seal line 44. In this way the projecting region 37 is continued along its original line of travel, and is prevented from inadvertently adhering to the heated roller 38.

To accommodate the edge portion of the pulley 53, and the belt 51, and to clear the rollers 38, 39, the deflector 45 may be appropriately cut away, as indicated at 56.

In the region of advancement of the bag immediately after it leaves the sealing station, a transverse pneumatic pressure is exerted upon the discardable marginal section, to separate and remove it bodily from the filled and now sealed section of the bag. One way of accomplishing this is to provide a blower nozzle of appropriate shape alongside the path of travel, as indicated at 57, and to provide an aligned receiving conduit or pipe 58 on the opposite side. If compressed air is employed for the purpose, the blast will travel in the direction of the arrow 59 of FIGURE 8 and will separate the undesired section of the region 37, as indicated in FIGURE 8, from the body of the bag. If the pressure is combined with a suction applied within the conduit 58, the separated piece of material will be drawn away to a collection point.

The result is that the bag, when discharged from the apparatus at the left end of FIGURE 1, has an edge seal as clearly indicated at FIGURE 9. Since this seal exists along the seal line 44, the same reference numeral has been applied thereto.

A perspective view of the filled and sealed bag is shown in FIGURE 10. The rectangular area designated by dot-and-dash lines is intended to represent the undesired discardable section that has been separated from the body of the bag during the carrying out of the procedure herein described.

It will be understood that under certain circumstances the deflector 45 may be modified in shape or arrangement, or might even be omitted entirely, reliance being had solely upon the deflector belt 51 for keeping the projecting region 37 from inadvertent contact with the heated roller. In this connection, it is to be observed that the belt 51 is caused to travel through a considerable distance both in advance of and beyond the sealing station. This is for the purpose of allowing the belt to cool between its periods of direct contact with the heated roller, since an undesirable accumulation of heat in the belt 51 would cause it to adhere to the marginal skirt subsequently to be blown away.

The treatment of filled bags in the manner described, although preferably carried out with the aid of apparatus of the character illustrated, may nevertheless be performed by other apparatus, or by separate pieces of mechanism, as will be readily understood. For example, a bag might be manually grasped to press the two walls of the opening together, then manually directed to and through a sealing station and then immediately subjected to a transverse pneumatic pressure to separate the filled section from the undesired marginal section.

The apparatus herein described and illustrated has proven satisfactory on a continuous production basis, operating reliably over long periods of time at sealing speeds up to and exceeding one thousand inches per minute.

It is to be understood, of course, that many of the details herein described and illustrated may be modified by those skilled in the art without necessarily departing from the spirit and scope of the invention as expressed in the appended claims. It is therefore intended that these details be interpreted as being merely illustrative.

What is claimed is:

1. In a heat-sealing machine adapted to form an edge-seal closure on a plurality of superposed heat-sealable plies, a pair of opposed belts adapted to engage said plies inwardly from the edges thereof and adjacent to a line along which the seal is to be made, heat applying means comprising a pair of tangentially arranged rollers one of which has a heated attenuated edge, means for moving the belts to advance the engaged plies through the nip of said rollers so that a heat-seal is effected along said sealing line, and means operable upon said plies during their advance to shield the projecting region of the several plies beyond the sealing line from contact with the rollers.

2. In a heat-sealing machine, the structure set forth in claim 1, said shielding means comprising a first deflector plate adjacent to said belts and extending along the path of approach to said rollers, said plate in cross-section being angled upwardly away from the heated roller and being positioned to engage one side of said projecting region, and a second deflector plate of lesser height arranged alongside the first to engage and sustain the deflected projecting region of the plies along the opposite side thereof.

3. A heat-sealing apparatus for bags composed of heat sealable material, comprising means for gripping a bag inwardly of its mouth to thereby provide a projecting marginal edge portion beyond the point of gripping engagement, said gripping means conveying the bag so engaged, a pair of sealing rollers between which the marginal edge portion of the bag is moved by said gripping and conveying means, said rollers being operative to seal together the walls of the bag along a line located inwardly of its mouth to thereby leave a discardable portion between the line of seal and said mouth, means for deflecting said discardable portion while the bag is being sealed, said means including a traveling belt operative against said discardable portion, and a pneumatic blower operative directly after the sealing operation to separate and remove the discardable portion from the remainder of the bag while the bag is softened along the line of the seal.

4. In a heat-sealing machine adapted to form an edge-seal closure on a plurality of superposed heat-sealable plies, a pair of opposed belts adapted to engage said plies adjacent to the line along which the seal is to be made, heat-applying means comprising a pair of tangentially arranged rollers one of which has a heated attenuated edge, means for moving the belts to advance the engaged plies through the nip of said rollers, and shielding means operable upon said plies during their advance to shield the projecting region of the several plies beyond the sealing line from contact with the rollers, said shielding means comprising a third movable belt arranged adjacent to the sealing line along the path of travel immediately preceding and following said roller nip, said belt being positioned to contact said projecting region of the plies on the surface adjacent to the heated roller and thus to maintain the travel of said projecting region along a direction tangential to said heated roller.

5. In a heat-sealing machine adapted to form an edge-seal closure on a plurality of superposed heat-sealable plies, a pair of opposed belts adapted to engage said plies adjacent to the line along which the seal is to be made, heat-applying means comprising a pair of tangentially arranged rollers one of which has a heated attenuated edge, means for moving the belts to advance the engaged plies through the nip of said rollers, and shielding means operable upon said plies during their advance to shield the projecting region of the several plies beyond the sealing line from contact with the rollers, said shielding means comprising a third belt arranged adjacent to the sealing line along the path of travel immediately preceding and following said roller nip, said belt bearing against said heated roller adjacent to the attenuated edge of the latter and engaging the projecting region of the plies to continue said region along its original path of travel, and means for guiding said belt around relatively remote pulleys to allow the belt to cool between intervals of contact with said heated roller.

6. In a heat-sealing machine adapted to form an edge-seal closure on a plurality of superposed heat-sealable plies, a pair of opposed belts adapted to engage said plies adjacent to the line along which the seal is to be made, heat-applying means comprising a pair of tangentially arranged rollers one of which has a heated attenuated edge, means for moving the belts to advance the engaged plies through the nip of said rollers, and shielding means operable upon said plies during their advance to shield the projecting region of the several plies beyond the sealing line from contact with the rollers, said shielding means comprising a deflector plate extending in the direction of belt advancement along the path of approach to said rollers, said plate being positioned to be encountered by and to sustain said projecting region, said plate having a cut-away recess adjacent to the nip of said rollers and said shielding means comprising also a third belt arranged adjacent to the sealing line along the path of travel immediately preceding and following said roller nip, said belt engaging said projecting region of the plies in said cut-away recess of the deflector plate and thus continuing said projecting region along a path of travel tangential to said rollers.

7. In a heat-sealing machine adapted to form an edge-seal closure on superposed heat-sealable plies and inwardly of the edges of said plies so that a projecting region is formed on the plies beyond the line of seal, a pair of opposed belts adapted to engage said plies adjacent to the line along which the seal is to be made and inwardly of said projecting region, heat-applying means comprising a pair of tangentially arranged rollers one of which has a heated attenuated edge, means for moving the belts to advance the engaged plies through the nip of said rollers, and means operable upon said plies during their movement past the nip of said rollers to separate and remove the projecting region that lies beyond the sealing line, said separating means comprising a pneumatic device arranged adjacent to the path of belt advancement and operable to exert a pneumatic force upon the face of said projecting region in a direction transverse of its path of travel to thereby detach and move said projecting region away from the sealed plies.

8. In a heat-sealing machine adapted to join a plurality of superposed heat-sealable plies along a sealing line spaced inwardly from the edges of the plies, conveyor means for engaging said plies adjacent to and inwardly of said line whereby the edge portions of the plies project beyond said line, said conveyor means being adapted to carry the engaged plies in a direction parallel to said line, heat applying means positioned to apply a sealing heat to said plies along said line as the plies are moved past said heat applying means by the conveyor means, shielding means for engaging the projecting portions of said plies and maintaining them out of contact with said heat applying means during said movement, and means operative upon said projecting portions of the plies in the region of travel immediately beyond the heat applying means for severing said projecting portions along the line of seal and removing them.

References Cited in the file of this patent

UNITED STATES PATENTS

| | | |
|---|---|---|
| 1,841,539 | Kleinschmit | Jan. 19, 1932 |
| 2,185,647 | Penn | Jan. 2, 1940 |
| 2,265,359 | Neumann | Dec. 9, 1941 |
| 2,423,237 | Haslacher | July 1, 1947 |
| 2,484,641 | O'Hara | Oct. 11, 1949 |
| 2,627,213 | Nye | Feb. 3, 1953 |
| 2,641,304 | Biddinger | June 9, 1953 |
| 2,676,444 | Gaubert | Apr. 27, 1954 |
| 2,697,473 | Techtmann | Dec. 21, 1954 |
| 2,699,198 | Balzhiser | Jan. 11, 1955 |
| 2,714,416 | Fener | Aug. 2, 1955 |
| 2,762,420 | Stanton | Sept. 11, 1956 |
| 2,800,162 | Rohdin | July 23, 1957 |
| 2,913,863 | Sylvester et al. | Nov. 24, 1959 |

FOREIGN PATENTS

| | | |
|---|---|---|
| 696,398 | Great Britain | Aug. 26, 1953 |